(12) United States Patent
Kelnhofer et al.

(10) Patent No.: US 7,185,853 B2
(45) Date of Patent: Mar. 6, 2007

(54) AIR DISCHARGE VALVE FOR AN AIRCRAFT

(75) Inventors: Juergen Kelnhofer, Jork (DE); Marcus Petrac, Deinste (DE); Uwe Buchholz, Bliedersdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 116 days.

(21) Appl. No.: 10/812,505

(22) Filed: Mar. 29, 2004

(65) Prior Publication Data

US 2005/0151016 A1    Jul. 14, 2005

(30) Foreign Application Priority Data

Mar. 27, 2003  (DE)  ................ 103 13 729

(51) Int. Cl.
    *B64C 1/14*        (2006.01)
(52) U.S. Cl. .................................. 244/129.5
(58) Field of Classification Search ............ 244/129.1, 244/129.4, 129.5, 136, 118.5, 117, 119, 199.1, 244/199.2, 199.3
    See application file for complete search history.

(56) References Cited

U.S. PATENT DOCUMENTS

| | | | | | |
|---|---|---|---|---|---|
| 1,559,091 | A | * | 10/1925 | Hall | 244/212 |
| 1,793,702 | A | * | 2/1931 | Ksoll | 244/212 |
| 1,810,693 | A | * | 6/1931 | Alfaro | 244/211 |
| 1,818,322 | A | * | 8/1931 | Hall | 244/204 |
| 2,041,793 | A | * | 5/1936 | Stalker | 244/200.1 |
| 2,808,257 | A | * | 10/1957 | Brookbank | 49/109 |
| 2,990,138 | A | * | 6/1961 | Shaw | 244/12.3 |
| 3,010,680 | A | * | 11/1961 | Kaplan | 244/207 |
| 3,099,423 | A | * | 7/1963 | Wilde et al. | 244/23 R |
| 3,100,377 | A | * | 8/1963 | Kosin et al. | 239/265.19 |
| 3,258,206 | A | * | 6/1966 | Simonson | 239/265.27 |
| 3,347,496 | A | * | 10/1967 | Opfer, Jr. | 244/53 B |
| 3,387,804 | A | * | 6/1968 | Rhines | 244/129.5 |
| 3,426,984 | A | * | 2/1969 | Emmons | 244/117 R |
| 3,486,721 | A | * | 12/1969 | Myczinski | 244/53 R |
| 3,544,045 | A | * | 12/1970 | Butscher | 244/129.1 |

(Continued)

FOREIGN PATENT DOCUMENTS

DE    19713125    10/1998

*Primary Examiner*—Teri Pham Luu
*Assistant Examiner*—Stephen Holzen
(74) *Attorney, Agent, or Firm*—W. F. Fasse; W. G. Fasse

(57) ABSTRACT

An air discharge valve for an aircraft has an inner valve flap (1) and an outer valve flap (3) which partially overlap each other to form a nozzle of the Laval type with a nozzle inlet (6) converging toward a nozzle neck (S) and with a nozzle outlet (7) diverging away from the nozzle neck (S). The inner valve flap (1) has a trailing edge (8A) hinged to the aircraft body and a first leading edge (8) facing in the flight direction and having a curved sectional configuration. The outer valve flap (3) has a second leading edge (9) hinged to the aircraft body and a trailing edge (9A). Both flaps (1, 3) have a wedge shape. An outwardly facing surface portion (11B) of the inner flap (1) forms an air flow guide for air flowing out of the nozzle outlet (7). An inwardly facing surface portion (15B) of the outer flap (3) forms an air flow guide into the nozzle inlet (6) formed by the curved sectional configuration of the first leading edge (8) and by the inwardly facing surface portion (15B).

16 Claims, 2 Drawing Sheets

U.S. PATENT DOCUMENTS

| | | | |
|---|---|---|---|
| 3,545,701 A * | 12/1970 | Bertin et al. | 244/12.3 |
| 3,740,006 A * | 6/1973 | Maher | 244/129.5 |
| 3,770,227 A * | 11/1973 | Von Ohain et al. | 244/207 |
| 3,819,134 A * | 6/1974 | Throndson | 244/207 |
| 3,941,335 A * | 3/1976 | Viets | 244/203 |
| 4,235,397 A * | 11/1980 | Compton | 244/12.5 |
| 4,358,074 A * | 11/1982 | Schoen et al. | 244/12.4 |
| 4,546,606 A * | 10/1985 | Bouiller et al. | 60/262 |
| 4,760,960 A * | 8/1988 | Ward et al. | 239/265.25 |
| 4,828,173 A * | 5/1989 | Guerty | 239/1 |
| 5,062,588 A * | 11/1991 | Garland | 244/23 D |
| 5,170,963 A * | 12/1992 | Beck, Jr. | 244/12.2 |
| 5,207,558 A * | 5/1993 | Hagle et al. | 415/161 |
| 6,050,527 A * | 4/2000 | Hebert et al. | 244/210 |
| 6,273,136 B1 * | 8/2001 | Steinert et al. | 137/630 |
| 2005/0151016 A1 * | 7/2005 | Kelnhofer et al. | 244/129.1 |

* cited by examiner

US 7,185,853 B2

AIR DISCHARGE VALVE FOR AN AIRCRAFT

PRIORITY CLAIM

This application is based on and claims the priority under 35 U.S.C. §119 of German Patent Application 103 13 729.7, filed on Mar. 27, 2003, the entire disclosure of which is incorporated herein by reference.

FIELD OF THE INVENTION

The invention relates to air discharge valves for an aircraft. Such valves are installed in an air outlet through the body wall of the aircraft for controlling the air pressure inside the aircraft body.

BACKGROUND INFORMATION

It is known to construct such valves for recovering a certain thrust generated because the pressure Pi inside the aircraft is higher than the pressure Pa outside the aircraft. Conventional flap valves of this type comprise one or several flaps. The position of these valve flaps or gates relative to a valve opening is controllable by a drive mechanism inside the aircraft. The drive is normally controlled in closed loop fashion by a feedback control. The flap normally stays open or the flaps normally stay open as long as there is a positive pressure difference between the air pressure inside the aircraft and the atmospheric pressure outside the aircraft. Depending on the position of the flaps, particularly if the flaps are closed, the internal pressure inside the aircraft may be adjusted to provide a negative differential pressure. The valve flaps generally have plane surfaces or edges for forming an air discharge gap and outwardly facing surfaces adapted to the aircraft contour.

German Patent Publication DE 197 13 125 A1 (Steinert et al.) discloses a stage valve that has a first smaller stage (20) and a second larger stage (30). The first valve stage (20) and the second valve stage (30) are coupled with a drive gear (40) in such a way that the first smaller valve stage can be operated separately from the second larger valve stage. In one conventional embodiment the smaller valve stage has a centrally journaled flap mounted within an opening of a larger flap. In the other conventional embodiment a larger flap and a smaller flap are each centrally journaled. Thrust recovery is accomplished in each conventional version, particularly during cruising flight when the internal cabin pressure is substantially larger than the external atmospheric pressure at cruising altitudes. In the other conventional embodiment one flap (70) has a bulging broadened end (73) for diverting the air stream onto a guide plate (76). The valve stages are supposed to have aerodynamically beneficial characteristics. However, a nozzle for the air discharge is not formed. Just air discharge channels are formed.

U.S. Pat. No. 3,426,984 (Emmons) discloses an aircraft pressurization outflow valve with two flaps each hinged at its end opposite the flap end edges (40, 42) that form an air outflow gap. These flap end edges (40, 42) form a convergent or convergent-divergent nozzle for effectively recovering thrust from the air discharging out of the cabin into the airstream around the aircraft outer body skin.

Further conventional air discharge valves similar to the above described valves are illustrated in present FIGS. 1, 2 and 3. FIG. 1 shows an air discharge valve installed in the airbus model "320/A340". FIG. 2 shows an air discharge valve installed in the aircraft model "Boeing 777". FIG. 3 shows an air discharge valve installed in the aircraft model "Boeing 737". These conventional valves function as pressure control valves operating in response to a closed loop control signal.

Conventional valves as described above leave room for improvement particularly with regard to noise reduction, particularly in the below critical pressure range. Conventional valves also leave room for improvement with regard to making the thrust recovery more efficient, particularly for a positive pressure difference ΔP when the internal pressure Pi is larger than the external pressure Pa.

OBJECTS OF THE INVENTION

In view of the foregoing it is an aim of the invention to achieve the following objects singly or in combination:

to construct a pressure regulating air discharge valve for an aircraft in such a way that the flow conditions into the valve, through the valve, and out of the valve are substantially improved;

to improve the thrust recovery generated by air flowing out of the aircraft body; and to noticeably reduce the air flow noise of the air flowing out of the aircraft body into the surrounding atmosphere.

SUMMARY OF THE INVENTION

The above objects have been achieved according to the invention by an air discharge valve comprising a first valve flap having a first wedge-shaped sectional configuration with a first leading edge facing in said flight direction and a first trailing edge facing opposite said flight direction, a first journal journalling said first valve flap (1) to said aircraft body at a point closer to said first trailing edge than to said first leading edge, a second valve flap having a second wedge-shaped sectional configuration with a second leading edge facing in said flight direction and a second trailing edge facing opposite said flight direction, a second journal journalling said second valve flap to said aircraft body at a point closer to said second leading edge than to said second trailing edge, at least said first leading edge having a curved sectional configuration, said first journal and said second journal being spaced from each other in said flight direction to provide an overlap area between said first and second valve flaps, a nozzle neck formed between a first facing surface of said first valve flap and a second facing surface of said second valve flap, said facing surfaces facing each other at least partially, a nozzle inlet converging toward said nozzle neck, a nozzle exit diverging away from said nozzle neck along said overlap area, said converging nozzle inlet and said diverging nozzle exit together forming a nozzle length in an air flow direction.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
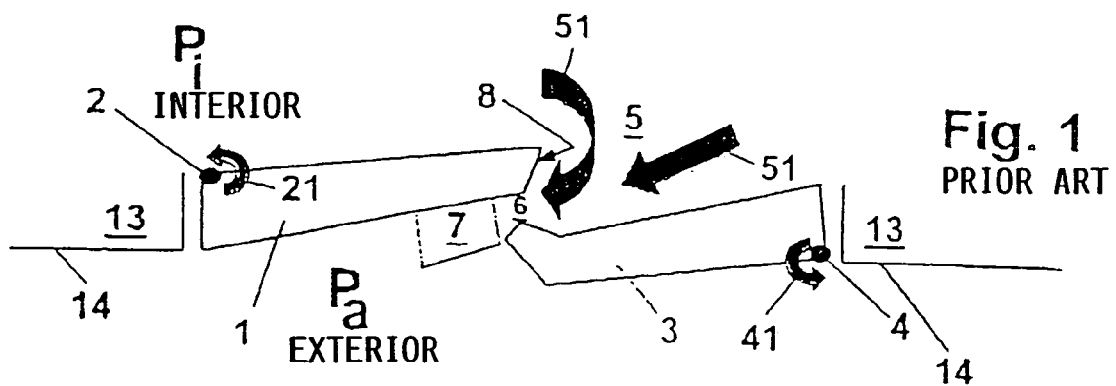
FIGS. 1, 2 and 3 show schematically conventional valves as described above.
Figure 2:
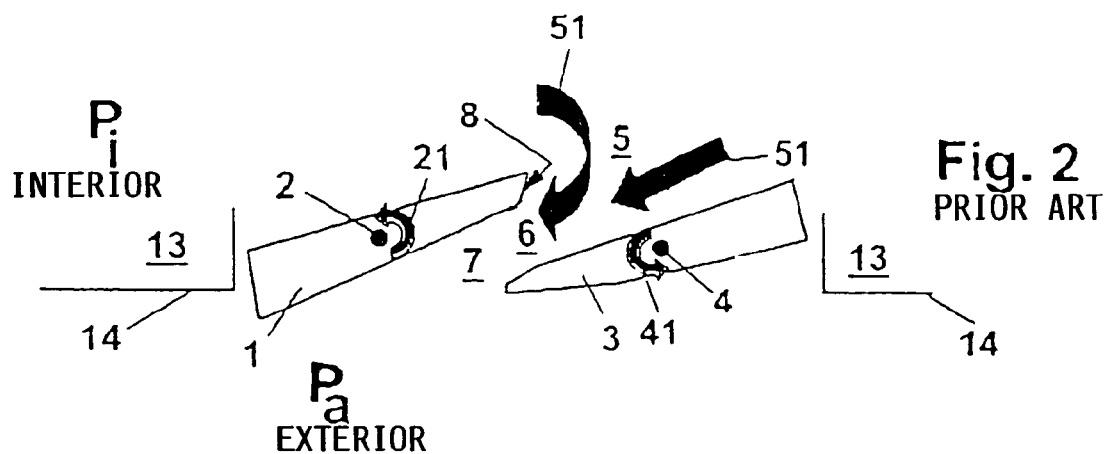
Figure 3:
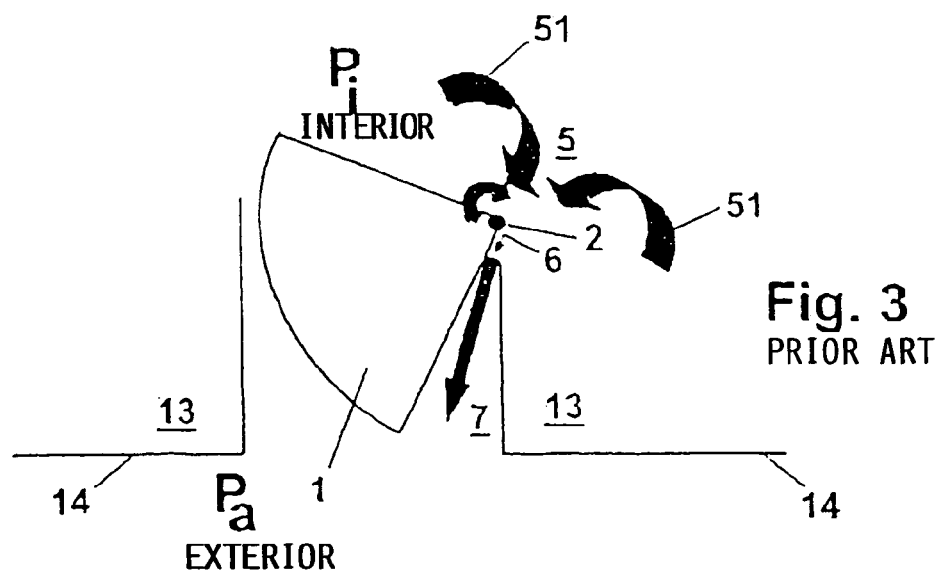
Figure 4:
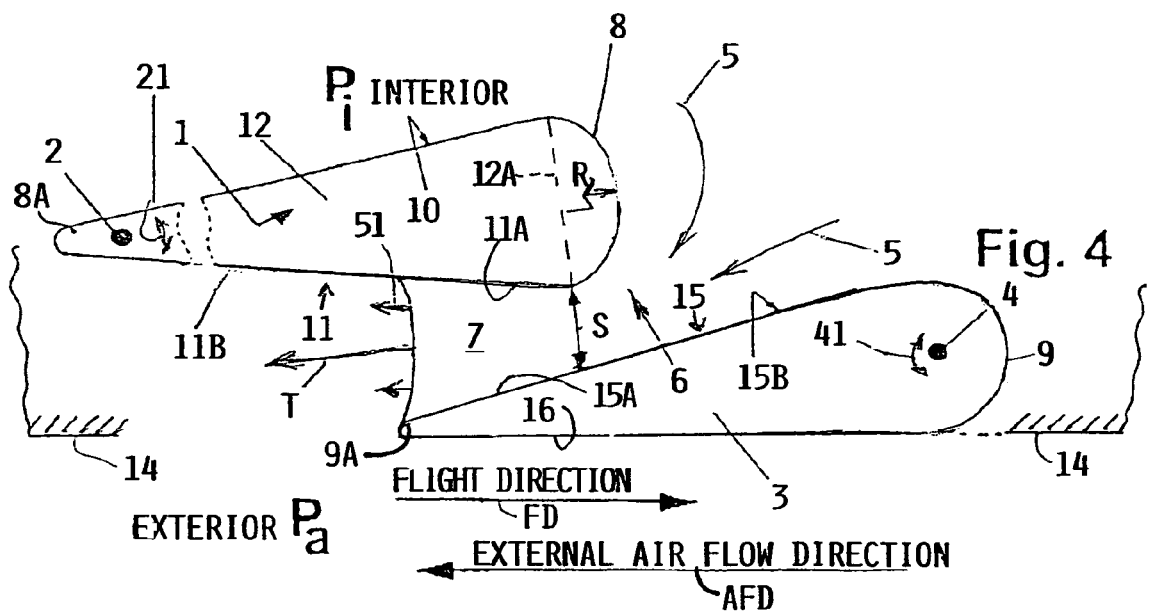
FIG. 4 illustrates a schematic side view of an air discharge valve according to the invention in an open position.

FIG. 4 shows a side or end view of two valve flaps 1 and 3 forming the present valve. A closed loop flap drive mechanism is not shown since such a drive is conventional.

The valve according to the invention shown in FIG. 4 comprises an inner valve flap 1 and an outer valve flap 3. The terms "inner" and "outer" have reference to a longitudinal central axis of an aircraft body 14 merely shown symbolically. Flap 1 is positioned more radially inwardly of the aircraft body 14 than flap 3. The interior pressure Pi prevails inside the aircraft body 14. The exterior pressure Pa prevails outside of the aircraft. Each valve flap 1 and 3 has a triangular or wedge-shaped sectional configuration formed by a body that substantially has a wedge shape 12. The first or inner flap 1 has a leading edge 8 facing in the flight direction FD as defined by the aircraft body 14. External air flows in a direction AFD opposite to the flight direction. The first or inner flap 1 has a trailing edge 8A and is hinged by a journal 2 to the aircraft body 14. The journal 2 is positioned closer to the trailing edge 8A than to the leading edge 8 of the flap 1. The leading edge 8 forms part of or is attached to a lateral narrow wedge surface 12A and has a curved or rounded sectional configuration with a radius R that is preferably a single radius of a circle. However, the leading edge 8 having the curved sectional configuration, may also be formed by several radii depending on the desired aerodynamic shape of the leading edge 8. Additionally, the first or inner flap 1 has a radially inwardly facing wedge surface 10 and a radially outwardly facing wedge surface 11.

The second flap 3 has a construction similar to that of the first flap 1. FIG. 4 shows that both flaps 1 and 3 are identical in their sectional configuration. More specifically, the second flap 3 also has a wedge-shaped sectional configuration with an inwardly facing surface 15 and an outwardly facing surface 16 and further including a leading edge 9 and a trailing edge 9A. The second leading edge 9 is preferably also aerodynamically shaped. However, the shape or cross-sectional configuration of the second leading edge 9 is not as critical as the aerodynamic shape of the leading edge 8 of the first flap 1 because the leading edge 8 forms part of a leading funnel into a nozzle inlet 6.

The second flap 3 is also hinged to the aircraft body 14 by a journal 4 positioned closer to the leading edge 9 than to the trailing edge 9A. An arrow 21 indicates the tilting motion of the flap 1 about the hinge 2 in response to the control or drive of the above mentioned closed loop drive mechanism not shown. Similarly, the arrow 41 indicates the tilting motion of the flap 3 about the journal 4 in response to the operation of the drive mechanism.

The first journal 2 and the second journal 4 are spaced from each other in the flight direction FD and the first and second flaps 1 and 3 are so dimensioned, that an overlap area is formed between the leading end of the first flap 1 and the trailing end of the second flap 3. When the flaps 1 and 3 are in the open position as shown in FIG. 4, a nozzle neck S is formed between the two flaps 1 and 3. The above mentioned nozzle inlet 6 is formed between the leading edge 8 of the first flap 1 and the inwardly facing surface 15 of the second flap 3. The nozzle inlet 6 converges toward the nozzle neck S. A nozzle exit 7 is formed downstream of the nozzle neck S by a facing surface portion 11A of the first flap 1 and by a facing surface portion 15A of the second flap 3. The surfaces 11 and 15 and their respective portions 11A, 11B and 15A, 15B are referred to as facing surfaces because these surfaces face each other at least in the overlap area formed by the nozzle inlet 6 and the nozzle exit 7. The air flowing out of the nozzle exit 7 is indicated by the arrows 51 and generates a thrust indicated by the arrow T since in the nozzle the several air flows 5 are consolidated into a single air flow 51 that is accelerated in the nozzle to at least a sonic velocity preferably to a supersonic velocity that depends on a critical ratio of the external pressure Pa to the internal pressure Pi. This critical pressure ratio $(Pa/Pi)_{crit}$ is approximately 0.527. Thus, $(Pa/Pi) \leq (Pa/Pi)_{crit} \approx 0.527$.

According to the invention the recovery of a thrust T at the nozzle exit 7 is more efficient than the thrust recovery of conventional valves because the aerodynamic configurations of the present valve flaps 1 and 3, particularly in the overlapping area have a length in the air flow direction AFD sufficient for preventing flow separation from said first and second facing surfaces and for avoiding vortex formations particularly along the curved sectional configuration of the leading edge 8 of the first flap 1 to thereby reduce noise generation.

The efficient aerodynamic characteristics of the present valve are further enhanced by the fact that a downwardly and outwardly facing surface portion 11B of the flap 1 and an inwardly facing surface portion 15B of the flap 3 form air guide surfaces the position of which can be controlled by the above mentioned drive mechanism. More specifically, the downwardly facing surface 11B forms a guide surface for the air flow 51 out of the nozzle exit 7. The surface portion 15B forms a guide surface for the air flow 5 into the nozzle inlet 6. Thus, flow separation and vortex formation are substantially avoided upstream and downstream of the Laval nozzle 6, S and 7. Minor vortex formation that does not adversely affect the thrust recovery may be tolerated.

Preferably, the nozzle neck S is positioned where the curvature of the leading edge 8 of the first flap 1 merges into the downwardly facing surface portion 11A of the flap 1. This point and thus the nozzle neck S is aligned with the lateral wedge surface 12A.

According to the invention the two flaps 1 and 3 may also be referred to as the AFT gate and the forward (FWD) gate respectively as viewed relative to the flight direction FD. The shape of the Laval nozzle is maintained according to the invention due to the overlap area between the forward valve flap 3 and the AFT valve flap 1 even if these flaps are moved relative to one another as long as the above mentioned pressure ratio condition $(Pa/Pi) \leq (Pa/Pi)_{crit}$ is maintained or at least as long as the closed loop controlled position of the two flaps 1 and 3 is within a flap positional range that is customary during cruising flight. Stated differently, motions of the flaps shall not adversely influence the Laval shape of the overlap area so that the at least sonic or preferably supersonic speed of the exiting airstream 51 is not adversely influenced. Motions of the flaps relative to each other primarily vary the cross-sectional area of the nozzle neck, but the Laval nozzle configuration is maintained for motions of the flaps within the above mentioned range that is sufficient for all practical purposes to prevent flow separation from the first and second facing surfaces, for avoiding vortex formations along the walls of the nozzle, particularly along the curved sectional configuration of the leading edge 8 of the first flap 1 and for reducing noise generation. Moreover, this nozzle configuration assures that a maximal or optimal energy is converted into the thrust T by the air exiting from the nozzle exit 7.

By avoiding flow separation and vortex formations, the efficiency of the air discharge controlled in closed loop fashion is substantially improved compared to the above described prior art because the formation of an undisturbed supersonic flow not only reduces noise, but also results in a more efficient air discharge.

In a preferred embodiment the outwardly facing surface portion 11B of the first flap 1 and the outwardly facing surface portion 16 of the second flap 3 are formed with an aerodynamic surface that merges into the outer surface configuration of the skin of the aircraft body 14.

It has been found that a semicircular cross-sectional configuration of the leading edge 8 of the first valve flap 1 forms an efficient air-inlet funnel for guiding the air flows 5 into the nozzle inlet 6 which is formed by the curved sectional configuration of the leading edge 8 and by the inwardly facing portion 15B of the inwardly facing surface 15 of the second flap 3.

Referring further to FIG. 4, the surface portions 15A and 15B together form an uninterrupted flat air guide surface upstream of the nozzle inlet 6, along the nozzle inlet 6, at the nozzle neck S and downstream of the nozzle neck along the overlap area that forms the diverging nozzle outlet 7. The displacement of the two flaps 1 and 3 in the flight direction relative to each other forms an efficient air lead-in guide that also contributes to avoiding particularly vortex formation in the lead-in area forming the nozzle inlet 6.

Figure 5:
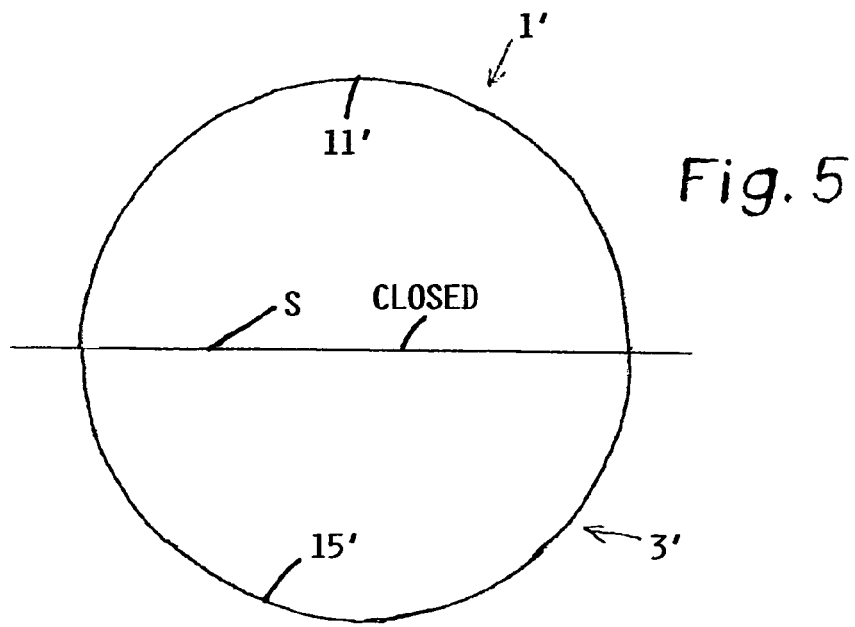
FIG. 5 illustrates symbolically a view in the flight direction into a nozzle exit formed by two valve flap surfaces facing each other and having a concave cross-sectional configuration.

FIG. 5 shows symbolically an embodiment in which the facing surfaces of flaps 1' and 3' are concavely curved to form the nozzle inlet 6 and the nozzle exit 7 except the nozzle neck S which is shown in the closed position in FIG. 5.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A combination of an aircraft body and an air discharge valve for discharging air under an interior pressure (Pi) from the interior of said aircraft body (14) to an exterior atmosphere having an exterior pressure (Pa), said combination comprising said aircraft body having an outer skin and a configuration defining a flight direction (FD) and said air discharge valve, an opening in said outer skin, said air discharge valve being installed in said opening, said air discharge valve comprising a first pivotable valve flap (1) having a first wedge-shaped sectional configuration with a first rounded leading edge (8) facing in said flight direction (FD) and a first trailing edge (8A) facing opposite said flight direction, a first journal (2) for pivoting said first valve flap (1) to said aircraft body (14) at a point closer to said first trailing edge (8A) than to said first rounded leading edge (8), a second pivotable valve flap (3) having a second wedge-shaped sectional configuration with a second rounded leading edge (9) also facing in said flight direction (FD) and a second trailing edge (3A) facing opposite said flight direction, a second journal (4) for pivoting said second pivotable valve flap (3) to said aircraft body (14) at a point closer to said second rounded leading edge (9) than to said second trailing edge (9A), said first journal (2) and said second journal (4) being displaced from each other in said flight direction to form a nozzle configuration between said first and second pivotable valve flaps (1, 3), said nozzle configuration comprising a nozzle neck (S) formed between a first facing surface (11) of said first pivotable valve flap (1) and a second facing surface (15) of said second pivotable valve flap (3), said facing surfaces (11, 15) facing each other along an overlap area (11A, 15A) for maintaining said nozzle configuration within a given flap motion control range, a nozzle inlet (6) converging toward said nozzle neck (S), said second facing surface (15) of said second valve flap (3) comprising an inwardly facing surface portion (15B) opposite said rounded leading edge (8) of said first valve flap (1), said inwardly facing surface portion (15B) and said rounded leading edge (8) forming an air inlet funnel into said nozzle inlet (6), a nozzle exit (7) diverging away from said nozzle neck (S) along said overlap area (11A, 15A), said converging nozzle inlet (6) and said diverging nozzle exit (7) together forming a sufficient nozzle length in an air flow direction (AFD) for reducing vortex and air flow separation in all controllable flap positions in which said nozzle configuration is maintained at sonic and supersonic air discharge speeds.

2. The combination of claim 1, wherein said first and second wedge-shaped sectional configurations of said first and second valve flaps (1, 3) are so positioned by tilting about said first and second journals (2, 4) that said nozzle neck (S) is maintained open in response to a ratio of said external pressure (Pa) to said internal pressure (Pi) (Pa/Pi) being smaller than or equal to a critical pressure ratio ($(Pa/Pi)_{crit}$) of said internal and external pressures (Pa/Pi $\leq$ $(Pa/Pi)_{crit}$).

3. The combination of claim 2, wherein said critical pressure ratio $(Pa/Pi)_{crit}$ is at least 0.527 for accelerating air in said nozzle inlet (6) at least to a sonic air discharge speed.

4. The combination of claim 1, wherein said first journal (2) and said second journal (4) are so positioned and spaced relative to each other, that a cross-sectional flow area of said nozzle neck (S) is increasable, decreasable and closeable by a respective tilting motion of at least one pivotable valve flap of said first and second pivotable valve flaps about a respective journal of said first and second journals (2, 3).

5. The combination of claim 1, wherein said nozzle neck (S) is positioned where a portion (11A) of said first facing surface (11) of said first valve flap (1) merges into said curved sectional configuration of said first leading edge (8) of said first valve flap (1).

6. The combination of claim 1, wherein said first and second facing surfaces (11, 15) of said first and second valve flaps (1, 3) are flat and plane and form said nozzle inlet (6), said nozzle exit (7) and said nozzle neck (S).

7. The combination of claim 1, wherein said first and second facing surfaces (11', 15') of said first and second valve flaps (1, 3) are concavely curved around said air flow direction (AFD) to form said nozzle inlet (6) and said nozzle exit (7), except said nozzle neck (S).

8. The combination of claim 1, wherein said first valve flap (1) and said second valve flap (3) comprise surface portions (11B, 16) facing outwardly relative to said aircraft body, said outwardly facing surface portions (11B, 16) each comprising an aerodynamic surface merging into an outer surface configuration of said aircraft body.

9. The combination of claim 1, wherein said rounded sectional configuration of said first leading edge (8) of said first valve flap (1) comprises a semicircular curvature.

10. The combination of claim 1, wherein said nozzle inlet (6) is formed by said rounded sectional configuration of said first leading edge (8) of said first valve flap (1) and by a portion (15B) of said second facing surface (15) of said second valve flap (2).

11. The combination of claim 1, wherein said first valve flap (1) is an inner valve flap relative to said aircraft body (14) and wherein said second valve flap (2) is an outer valve flap relative to said aircraft body (14), said first facing surface (11) comprising a first surface portion (11A) along said overlap area and a second surface portion (11B) facing outwardly outside said overlap area, said second surface portion (11B) forming a flow guide for air flowing out of said nozzle exit (7), said second facing surface (15) comprising a first surface portion (15A) along said overlap area and a second surface portion (15B) facing inwardly outside said overlap area, said second surface portion (15B) forming a flow guide for internal air (5) flowing into said nozzle inlet (6).

12. The combination of claim 11, wherein said inwardly facing surface portion (15A) of said second facing surface (15) and said second surface portion (15B) of said second facing surface (15) comprise together an uninterrupted flat and plane air guide surface upstream of said nozzle inlet (6), along the nozzle inlet (6), at said nozzle neck (S) and downstream of said nozzle neck (S) along said nozzle exit (7).

13. The combination of claim 1, wherein said first pivotable valve flap (1) and said second pivotable valve flap (3) comprise an identical cross-sectional configuration.

14. The combination of claim 13, wherein said first journal (2) is positioned in said first pivotable valve flap (1) next to said first trailing edge (8A), and wherein said second journal (4) is positioned in said second pivotable valve flap (3) next to said second rounded leading edge (9), and wherein said first rounded leading edge (8) and said second rounded leading edge (9) are facing in said flight direction (FD).

15. An air discharge valve for controlling an air discharge from an aircraft body, said air discharge valve comprising two valve flaps (1, 3) having identical cross-sectional configurations in the form of a wedge-shape with a rounded leading edge (8, 9) facing in a flight direction (FD) and with a trailing edge (8A, 9A) facing in an air discharge direction (AFD), said two valve flaps comprising an inner valve flap (1) including a pivot (2) for pivotably securing said inner valve flap (1) near its trailing edge (8A) to said aircraft body and an outer valve flap (3) including a pivot (4) for pivotally securing said outer valve flap (3) near its leading edge (9) to said aircraft body, said two valve flaps having facing surfaces (11, 15A) overlapping each other in a discharge air flow direction (AFD) for maintaining a nozzle configuration within a given flap motion control range.

16. The air discharge valve of claim 15, wherein each said rounded leading edge (8, 9) has an arc portion of a circular cross-section.

* * * * *